United States Patent
Ahmed et al.

(10) Patent No.: US 11,635,872 B2
(45) Date of Patent: Apr. 25, 2023

(54) SMART CAROUSEL OF IMAGE MODIFIERS

(71) Applicant: Snap Inc., Santa Monica, CA (US)

(72) Inventors: Samir Ahmed, Marina del Rey, CA (US); Farnaz Azmoodeh, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/626,418

(22) Filed: Jun. 19, 2017

(65) Prior Publication Data

US 2018/0143748 A1 May 24, 2018

Related U.S. Application Data

(60) Provisional application No. 62/425,500, filed on Nov. 22, 2016.

(51) Int. Cl.
| | |
|---|---|
| *G06F 3/0482* | (2013.01) |
| *G06T 11/60* | (2006.01) |
| *H04N 21/462* | (2011.01) |
| *H04N 21/431* | (2011.01) |
| *G06F 3/0488* | (2022.01) |
| *G06F 3/04847* | (2022.01) |

(52) U.S. Cl.
CPC .......... *G06F 3/0482* (2013.01); *G06F 3/0488* (2013.01); *G06F 3/04847* (2013.01); *G06T 11/60* (2013.01); *H04N 21/4312* (2013.01); *H04N 21/4622* (2013.01); *G06F 2203/04804* (2013.01); *G06T 2200/24* (2013.01)

(58) Field of Classification Search
CPC .. G06F 3/0482; G06F 3/04847; G06F 3/0488; G06F 2203/04804; G06T 11/60; H04N 21/4312; H04N 21/4622

USPC ........................................................ 715/825
See application file for complete search history.

(56) References Cited

U.S. PATENT DOCUMENTS

| | | | |
|---|---|---|---|
| 5,485,197 A | * | 1/1996 | Hoarty ............... H04N 21/4722 725/37 |
| 6,038,295 A | | 3/2000 | Mattes |
| 6,980,909 B2 | | 12/2005 | Root et al. |

(Continued)

FOREIGN PATENT DOCUMENTS

| | | |
|---|---|---|
| CA | 2887596 A1 | 7/2015 |
| KR | 102263125 B1 | 6/2021 |

(Continued)

OTHER PUBLICATIONS

Leyden, John, "This SMS will self-destruct in 40 seconds", [Online], Retrieved from the Internet: <URL: http://www.theregister.co.uk/2005/12/12/stealthtext/, (Dec. 12, 2005), 1 pg.

(Continued)

*Primary Examiner* — Sherief Badawi
*Assistant Examiner* — Koorosh Nehchiri
(74) *Attorney, Agent, or Firm* — Schwegman Lundberg & Woessner, P.A.

(57) ABSTRACT

Embodiments of the present disclosure relate generally to techniques for automated organization and presentation of user-selectable features within user interfaces. More particularly, but not by way of limitation, the present disclosure addresses systems and methods for presenting and accessing filters within user interfaces displaying media content items.

20 Claims, 13 Drawing Sheets

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,028,250 B2* | 9/2011 | Vronay ............... G06F 3/0482 715/853 |
| 8,131,597 B2 | 3/2012 | Hudetz |
| 8,199,747 B2 | 6/2012 | Rojas et al. |
| 8,332,475 B2 | 12/2012 | Rosen et al. |
| 8,566,722 B2* | 10/2013 | Gordon ............... G06F 16/735 715/721 |
| 8,718,333 B2 | 5/2014 | Wolf et al. |
| 8,724,622 B2 | 5/2014 | Rojas |
| 8,752,113 B1* | 6/2014 | Good ............... H04L 65/762 725/115 |
| 8,874,677 B2 | 10/2014 | Rosen et al. |
| 8,909,679 B2 | 12/2014 | Roote et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,798,708 B1* | 10/2017 | Sharifi ............... G06V 30/416 |
| 10,095,386 B2* | 10/2018 | Yoon ............... G06F 3/0485 |
| 2007/0186177 A1* | 8/2007 | Both ............... G06F 3/04817 715/764 |
| 2009/0324103 A1* | 12/2009 | Gelfand ............... G06F 16/58 382/224 |
| 2011/0113384 A1* | 5/2011 | Gotcher ............... G06F 3/04815 715/851 |
| 2011/0170787 A1* | 7/2011 | Gum ............... H04W 4/029 382/209 |
| 2011/0202598 A1 | 8/2011 | Evans et al. |
| 2012/0105489 A1* | 5/2012 | Monroe ............... G06F 3/0482 345/684 |
| 2012/0209924 A1 | 8/2012 | Evans et al. |
| 2012/0304123 A1* | 11/2012 | Koradi ............... G06F 3/048 715/825 |
| 2013/0329060 A1* | 12/2013 | Yim ............... G06F 16/58 348/207.1 |
| 2014/0184858 A1* | 7/2014 | Yu ............... H04N 5/23229 348/241 |
| 2014/0279079 A1* | 9/2014 | Gudorf ............... G06F 17/00 705/14.73 |
| 2014/0337791 A1* | 11/2014 | Agnetta ............... G06F 3/16 715/784 |
| 2015/0212664 A1* | 7/2015 | Freer ............... G06F 3/0485 715/728 |
| 2015/0221066 A1* | 8/2015 | Kobayashi ............... G06T 7/194 382/284 |
| 2015/0277849 A1* | 10/2015 | Beaumier ............... A47B 81/06 715/716 |
| 2016/0085863 A1* | 3/2016 | Allen ............... G06Q 30/08 707/754 |
| 2016/0188658 A1* | 6/2016 | Thomson ............... G06Q 30/02 707/766 |
| 2016/0196584 A1* | 7/2016 | Franklin ............... G06F 3/04845 705/14.64 |
| 2016/0292926 A1* | 10/2016 | Rosenthal ............... H04N 21/41407 |
| 2016/0358229 A1* | 12/2016 | Bhalgat ............... H04L 51/32 |
| 2017/0352092 A1* | 12/2017 | Mitchell ............... G06T 15/503 |
| 2018/0039406 A1* | 2/2018 | Kong ............... G06F 9/451 |
| 2019/0362469 A1* | 11/2019 | Ilic ............... H04N 1/387 |

FOREIGN PATENT DOCUMENTS

| | | |
|---|---|---|
| WO | 2012058602 | 5/2012 |
| WO | WO-2018098171 | 5/2018 |

OTHER PUBLICATIONS

"International Application Serial No. PCT US2017 062830, Written Opinion dated Feb. 6, 2018", 7 pgs.

"International Application Serial No. PCT US2017 062830, International Search Report dated Feb. 6, 2018", 3 pgs.

"International Application Serial No. PCT/US2017/062830, International Preliminary Report on Patentability dated Jun. 6, 2019", 9 pgs.

"Korean Application Serial No. 10-2019-7017974, Notice of Preliminary Rejection dated May 21, 2020", W/English Translation, 14 pgs.

"Korean Application Serial No. 10-2019-7017974, Response Filed Jul. 21, 2020 to Notice of Preliminary Rejection dated May 21, 2020", w/ English Claims, 18 pgs.

"Korean Application Serial No. 10-2019-7017974, Response filed Jan. 29, 2021 to Final Office Action dated Nov. 28, 2020", w/English Claims, 23 pgs.

"Korean Application Serial No. 10-2019-7017974, Final Office Action dated Nov. 28, 2020", w/English Translation, 5 pgs.

* cited by examiner

| BASE SCORE | END | CURRENT FILTER CATEGORY |
|---|---|---|
| 8000 | 9000 | VISUAL FILTER |
| 6000 | 7000 | INFO FILTER |
| 4000 | 5000 | MOTION & REVERSE FILTER |
| 2000 | 3000 | BITMOJI FILTER |
| 1000 | 2000 | GEOFILTER |

FIG. 9

| FILTER ID | FILTER CATEGORY | FILTER CATEGORY BASE SCORE | FILTER SCORE | TOTAL SCORE |
|---|---|---|---|---|
| FACE SMOOTH | VISUAL | 8000 | 400 | 8400 |
| INSTA SNAP | VISUAL | 8000 | 300 | 8300 |
| MISS ETIKATE | VISUAL | 8000 | 200 | 8200 |
| GREYSCALE | VISUAL | 8000 | 100 | 8100 |
| SPEED | INFO | 6000 | 500 | 6500 |
| WEATHER | INFO | 6000 | 400 | 6400 |
| ALTITUDE | INFO | 6000 | 300 | 6300 |
| TIMESTAMP | INFO | 6000 | 200 | 6200 |
| BATTERY | INFO | 6000 | 100 | 6100 |
| SLOW MO | MOTION | 4000 | 400 | 4400 |
| FAST | MOTION | 4000 | 300 | 4300 |
| SUPER FAST | MOTION | 4000 | 200 | 4200 |
| REVERSE | REVERSE | 4000 | 100 | 4100 |
| FIRST FILTER | BITMOJI | 2000 | 0 | 2000 |
| GEOFILTER 1 | GEOFILTER | 1000 | 0 | 1000 |
| SCAN TO UNLOCK FILTER | GEOFILTER | 1000 | -100 | 900 |

1000

SMART CAROUSEL OF IMAGE MODIFIERS

CLAIM OF PRIORITY

This application claims the benefit of priority to U.S. Provisional Application Ser. No. 62/425,500, filed on Nov. 22, 2016, and which is incorporated herein by reference in its entirety.

TECHNICAL FIELD

Embodiments of the present disclosure relate generally to techniques for automated organization and presentation of user-selectable features within user interfaces. More particularly, but not by way of limitation, the present disclosure addresses systems and methods for presenting and accessing filters within user interfaces displaying media content items.

BACKGROUND

The popularity of electronic messaging, particularly instant messaging, continues to grow. Messaging applications and devices can provide communication between multiple users using a variety of media, such as text, images, sound recordings, or video recording. For example, video chatting allows two or more individuals to communicate picture images and/or video with each other using a combination of software applications, devices, and networks.

Many devices used for electronic messaging are embodied as portable communication devices, such as smartphones, tablets, and other wearables. These devices can be constrained by the size of their screens, being relatively small compared to modern computer monitors. Application developers attempt to design user interfaces within the limited screen real estate that blend a visually pleasant experience with providing sufficient access to application features. Accordingly, there is still a need in the art to improve organization and presentation of user-selectable features within user interfaces.

BRIEF DESCRIPTION OF THE DRAWINGS

Various ones of the appended drawings merely illustrate exemplary embodiments of the present disclosure and should not be considered as limiting its scope.

FIG. 9 is a table illustrating an exemplary base score arrangement used by the image capture device in operation, in several embodiments.

Figure 1:
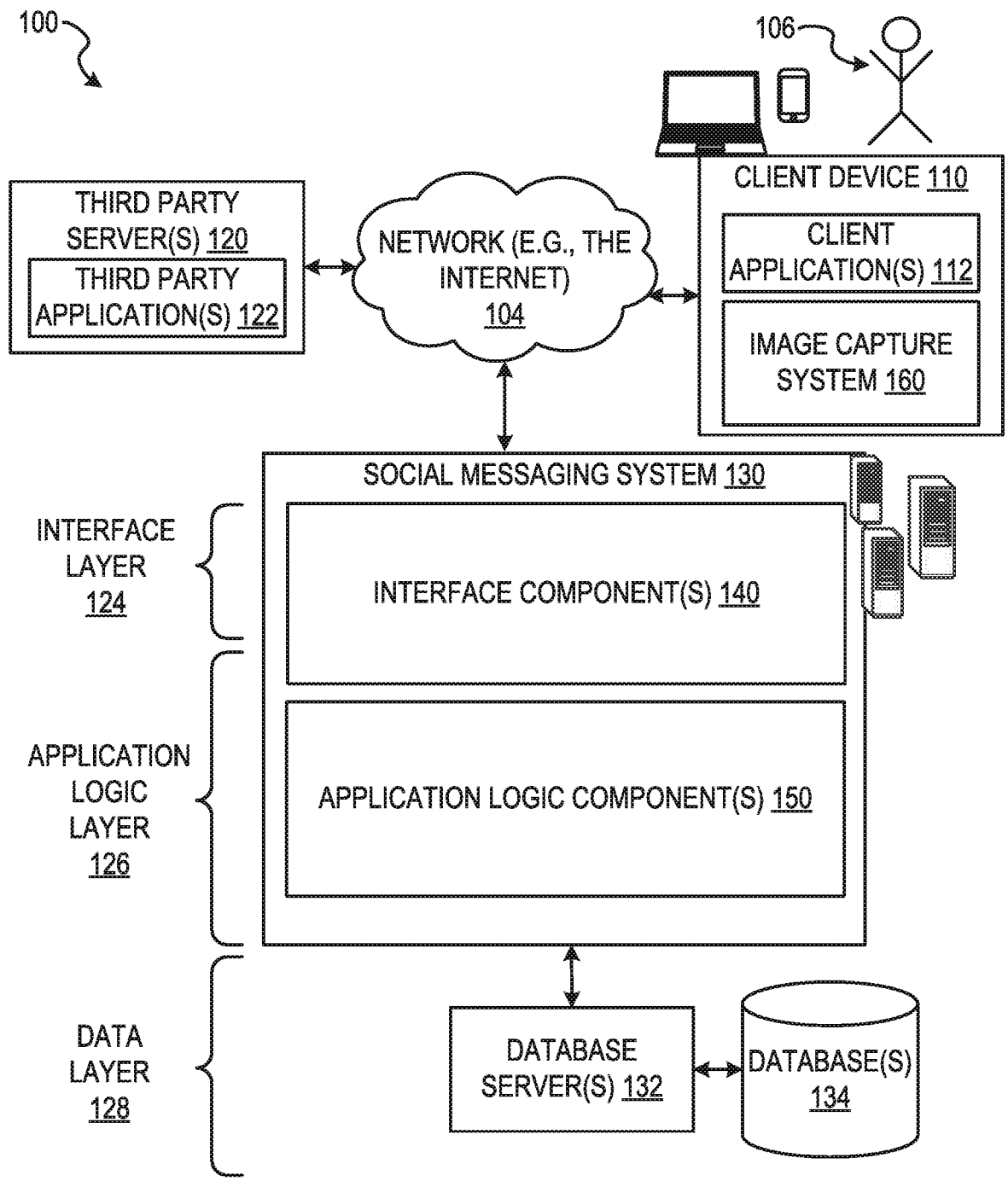
FIG. 1 is a block diagram illustrating a networked system, according to some exemplary embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure relate to improvements in the functionality of electronic messaging and imaging software and systems. In some embodiments, but not by way of limitation, the present disclosure addresses techniques for prioritized delivery of image modifiers (also referred to herein as filters or media overlays) to computing devices, the prioritized delivery at times conserving space on the computing devices by limiting delivery of a subset of image modifiers available to the computing devices. The prioritized delivery also at times improving user experience by delivery of a subset of image modifiers to the computing devices intended to be used more frequently. In some embodiments, but not by way of limitation, the present disclosure addresses techniques for optimized presentation of image modifiers within user interfaces of the computing devices, the optimized presentation at times improving user experience with the computing devices by presentation of image modifiers intended to be used more frequently.

Among other things, embodiments of present disclosure enable the prioritized delivery and organized presentation of image modifiers for use at a computing device. For example, image modifiers can be displayed in conjunction with media content (e.g., images and/or video) generated by an image-capturing device (e.g., a digital camera). In some embodiments, when a user swipes within a user interface on a camera view (e.g., an image capturing a field of view of an image capture device) to activate an image modifier (e.g., an image filter, a digital lens, a media overly, or a set of add on graphical elements), a first image modifier is identified and presented to the user.

The first image modifier may be selected according to a ranking within a set of image modifiers and according to a ranking of the set of image modifiers. The first image modifier can be identified according to a ranking among other image modifiers within a specified modifier category, according to a ranking across other image modifiers of other categories, or a combination thereof. Remaining image modifiers in the set of image modifiers may also be identified for presentation in a modifier carousel. In such embodiments, a user interaction is an interpretation of a first dimension of image modifier selection by the user. For example, swiping across a field of view of a front facing camera may return a modifier category (e.g., filter category) of "GEOFILTER." The return of the specified modifier category may be further based on an ordering of a plurality of categories (e.g., filter category, lens category, graphical element category), an ordering of image modifiers within at least one of the categories, or a combination thereof. A second user interaction with the media carousel can be an interpretation of a second dimension of image modifier selection by the user.

Presentation of image modifiers within a user interface can be defined by a user in some embodiments. The user may select an image modifier to add a set of image modifiers or a modifier category. The user may enter details relating to the category (e.g., name or description) and input an ordered list of image modifiers. After adding an image modifier into the list, the user may alter or move the image modifier to change the order in which the image modifier appears in a presentation of image modifiers within a user interface.

Presentation of image modifiers within the user interface can be defined by machine learning in some embodiments. A computing device may learn whether an image modifier belongs to one modifier category or another. The computing device may utilize a ranking approach to evaluate relevancy and priority of an image modifier relating to the category (e.g., name or description) and the ordering of its corresponding list of image modifiers. After adding an image modifier into the list, the computing device may alter or move the image modifier to change the order in which the image modifier appears in a presentation of image modifiers within the user interface. The computing device may delete less relevant or lower priority image modifiers from storage, for example, increasing storage available for user-generated content. The computing device or a server may prioritize delivery over a network of more relevant or higher priority image modifiers or sets of image modifiers, for example, improving responsiveness of the user interface when selecting certain image modifiers.

A. Social Messaging Client-Server Architecture

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receives requests from various client-computing devices and servers, such as client devices 110 executing client application(s) 112, and third party servers 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some exemplary embodiments, the client devices 110 form all or part of an image capture system 160 such that components of the image capture system 160 configure the client device 110 to perform a specific set of functions with respect to operations of the image capture system 160. One example of image capture system 160 is described further with respect to FIG. 2. Another example of image capture system 160 is described further with respect to FIG. 3.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the image capture system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers. Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

The social messaging system 130 may include at least a portion of the image capture system 160 capable of prioritizing delivery of image modifiers for captured data to the client device 110. The image capture system 160 may additionally identify and track usage of image modifiers by a user of the client device 110. Similarly, the client device 110 includes a portion of the image capture system 160, as described above. In other examples, client device 110 may include the entirety of image capture system 160. In instances where the client device 110 includes a portion of (or all of) the image capture system 160, the client device 110 can work alone or in cooperation with the social messaging system 130 to provide the functionality of the image capture system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the image capture system 160 may capture or otherwise receive a media content item. The device may modify the media content item with one or more image modifiers as a part of a generation of content for an ephemeral message.

B. Image Capture System

Figure 2:
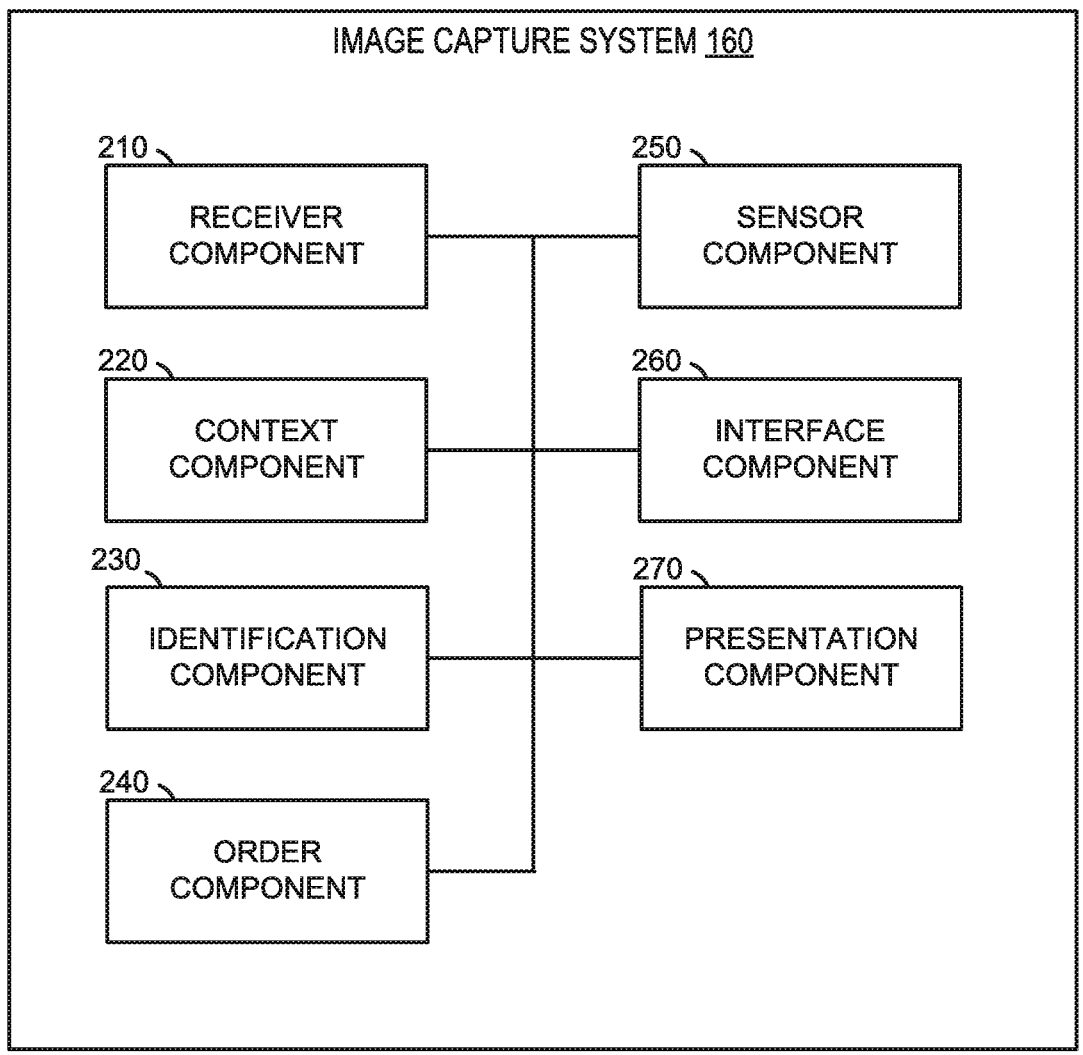
FIG. 2 is a diagram illustrating an image capture system, according to some exemplary embodiments.

In FIG. 2, in various embodiments, the image capture system 160 of FIG. 1 can be implemented as a standalone system or implemented in conjunction with the client device 110, and is not necessarily included in the social messaging system 130. The image capture system 160 is shown to include a receiver component 210, a context component 220, an identification component 230, an order component 240, a sensor component 250, an interface component 260, and a presentation component 270. All, or some, of the components 210-270, communicate with each other, for example, via a network coupling, shared memory, and the like. Each component of components 210-270 can be implemented as a single component, combined into other components, or further subdivided into multiple components. Other components not pertinent to exemplary embodiments can also be included, but are not shown.

Figure 3:
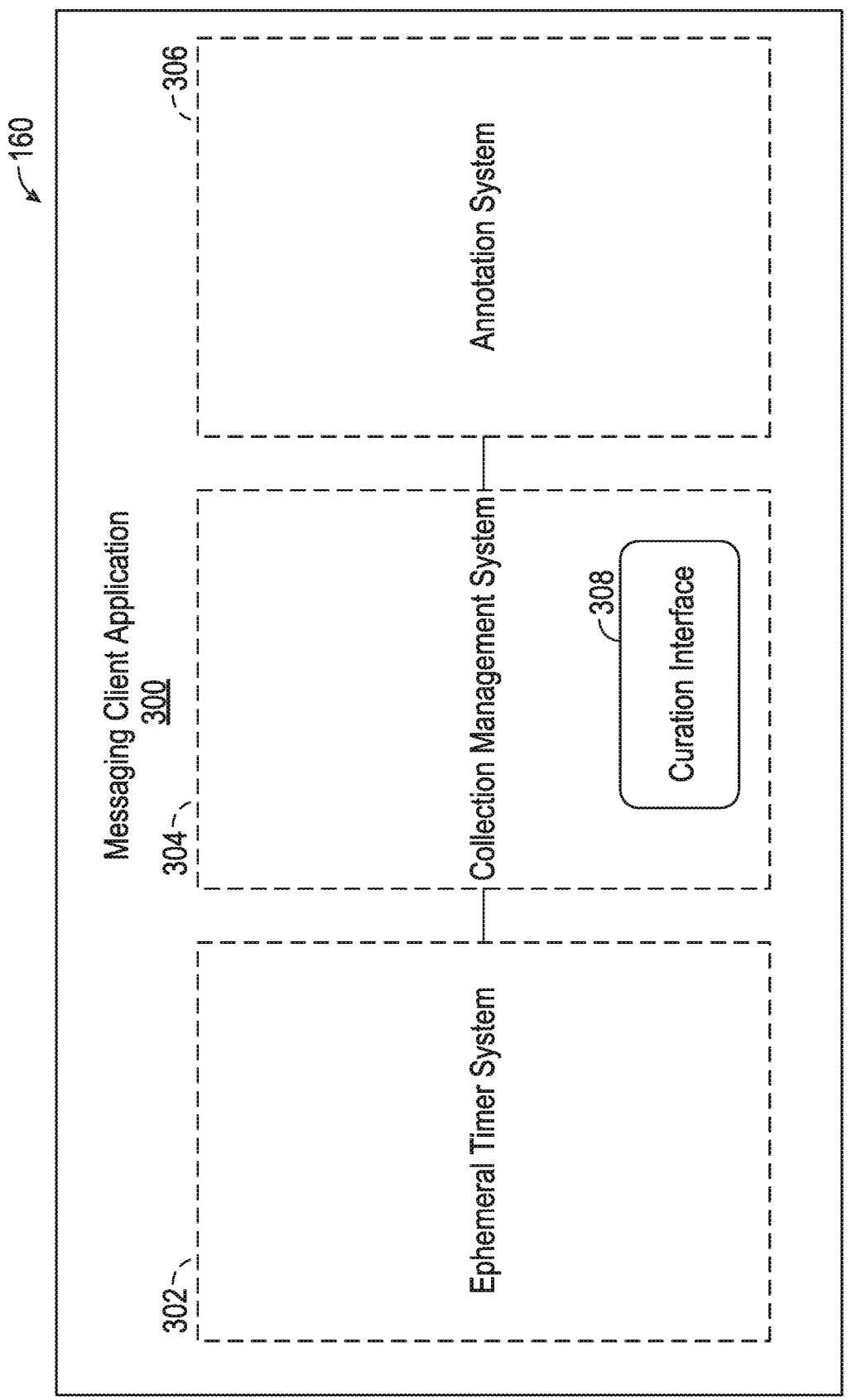
FIG. 3 is block diagram illustrating further details regarding an image capture system, according to exemplary embodiments.

FIG. 3 is block diagram illustrating further details regarding image capture system 160, according to exemplary embodiments. Specifically, image capture system 160 is shown to comprise messaging client application 300, which in turn embody a number of some subsystems, namely an ephemeral timer system 302, a collection management system 304 and an annotation system 306.

Ephemeral timer system 302 includes hardware and/or software elements responsible for enforcing the temporary access to content permitted by the messaging client application 300 and the social messaging system 130. To this end, the ephemeral timer system 302 incorporates a number of timers that, based on duration and display parameters associated with a message, or collection of messages (e.g., a SNAPCHAT story), selectively display and enable access to messages and associated content via the messaging client application 300.

Collection management system 304 includes hardware and/or software elements responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 304 may also be responsible for publishing an icon that provides notification of the existence of a particular collection to the user interface of the messaging client application 300.

Collection management system 304 furthermore includes the curation interface 308 that allows a collection manager to manage and curate a particular collection of content. For example, the curation interface 308 enables an event organizer to curate a collection of content relating to a specific event (e.g., delete inappropriate content or redundant messages). Additionally, the collection management system 304 employs machine vision (or image recognition technology) and content rules to automatically curate a content collection. In certain embodiments, compensation may be paid to a user for inclusion of user generated content into a collection. In such cases, the curation interface 308 operates to automatically make payments to such users for the use of their content.

Annotation system 306 includes hardware and/or software elements that provide various functions that enable a user to annotate or otherwise modify or edit media content associated with a message. For example, the annotation system 306 provides functions related to the generation and publishing of image modifiers for messages processed by social messaging system 130. The annotation system 306 operatively supplies an image modifier (e.g., a SNAPCHAT filter) to the messaging client application 300, for example, based on a geolocation of the client device 110. In another example, the annotation system 306 operatively supplies an image modifier to the messaging client application 300 based on other information, such as, social network information of the user of the client device 110. In embodiments, the annotation system 306 operatively supplies organizes a collection of image modifiers for the messaging client application 300 based on predetermined criteria, such as whether an image modifier a set of rules defining a category, specifying usage requirements, location limitations, sponsorship, and the like.

In general, an image modifier may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 110. For example, the image modifier including text that can be overlaid on top of a photograph/electronic image generated by the client device 110. In another example, the image modifier includes an identification of a location overlay (e.g., Venice beach), a name of a live event, or a name of a merchant overlay (e.g., Beach Coffee House). In another example, annotation system 306 uses the geolocation of the client device 110 to identify an image modifier that includes the name of a merchant at the geolocation of the client device 110. The image modifier may include other indicia associated with the merchant. The image modifiers may be stored in the databases 134 and accessed through the database servers 132.

In one exemplary embodiment, the annotation system 306 provides a publication platform that enables publishers to select a geolocation on a map and upload content associated with the selected geolocation. A publisher may also specify circumstances under which the particular image modifier should be offered to users of messaging client application 300. The annotation system 306 generates an image modifier that includes the uploaded content and associates the uploaded content with the selected geolocation.

Figure 4:
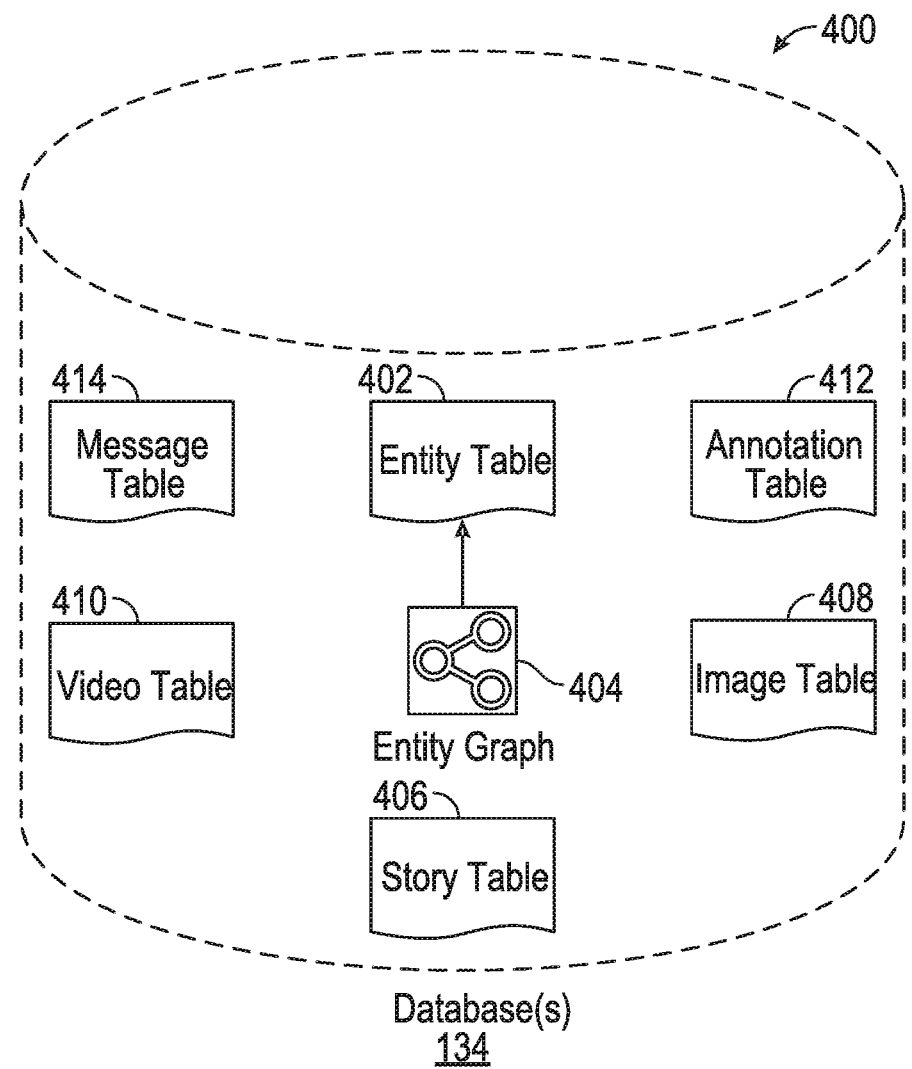
FIG. 4 is a schematic diagram illustrating data which may be stored in the database of the messaging server system, according to various exemplary embodiments.

In another exemplary embodiment, the annotation system 306 provides a publication platform that enables merchants to select a particular image modifier associated with a geolocation via a bidding process. For example, the annotation system 306 associates the image modifier of a highest bidding merchant with a corresponding geolocation for a predefined amount of time FIG. 4 is a schematic diagram 400 illustrating data 400 which may be stored in the database(s) 134 of the social messaging system 130, according to certain exemplary embodiments. While the content of database(s) 134 is shown to comprise a number of tables, it will be appreciated that the data could be stored in other types of data structures (e.g., as an object-oriented database).

In this example, database(s) 134 includes message data stored within a message table 414. The entity table 402 stores entity data, including an entity graph 404. Entities for which records are maintained within the entity table 402 may include individuals, corporate entities, organizations, objects, places, events etc. Regardless of type, any entity regarding which social messaging system 130 stores data may be a recognized entity. Each entity is provided with a unique identifier, as well as an entity type identifier (not shown).

The entity graph 404 furthermore stores information regarding relationships and associations between entities. Such relationships may be social, professional (e.g., work at a common corporation or organization) interested-based or activity-based, merely for example.

Database(s) 134 also stores annotation data, in the exemplary form of image modifiers (also known herein as filters), in an annotation table 412. Filters for which data is stored within the annotation table 412 are associated with and applied to videos (for which data is stored in a video table 410) and/or images (for which data is stored in an image table 408). Filters, in one example, are media overlays that are displayed as overlaid on an image or video during presentation to a recipient user. Filters may be organized, including a prioritize listing of filters from a gallery of filters presented to a sending user by the messaging client application 300 when the sending user is composing a message.

Filters may be of varies types. Other types of filers include geolocation filters (also known as geo-filters) which may be presented to a sending user based on geographic location. For example, geolocation filters specific to a neighborhood or special location may be presented within a user interface by the messaging client application 300, based on geolocation information determined by a GPS unit of the client device 110. Another type of filer is a data filer, which may be selectively presented to a sending user by the messaging client application 300, based on other inputs or information gathered by the client device 110 during the message creation process. Examples of data filters include current temperature at a specific location, a current speed at which a sending user is traveling, battery life for a client device 110 or the current time.

Other annotation data that may be stored within the image table 408 is so-called "lens" data. A "lens" may be a real-time special effect and sound that may be added to an image or a video.

As mentioned above, the video table 410 stores video data which, in one embodiment, is associated with messages for which records are maintained within the message table 414. Similarly, the image table 408 stores image data associated with messages for which message data is stored in the entity table 402. The entity table 402 may associate various annotations from the annotation table 412 with various images and videos stored in the image table 408 and the video table 410.

A story table 406 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 402). A user may create a "personal story" in the form of a collection of content that has been created and sent/broadcast by that user. To this end, the user interface of the messaging client application 300 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 300, to contribute content to a particular live story. The live story may be identified to the user by the messaging client application 300, based on his or her location. The end result is a "live story" told from a community perspective.

A further type of content collection is known as a "location story", which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein.

C. Dynamic Filter Carousel

Figure 5:
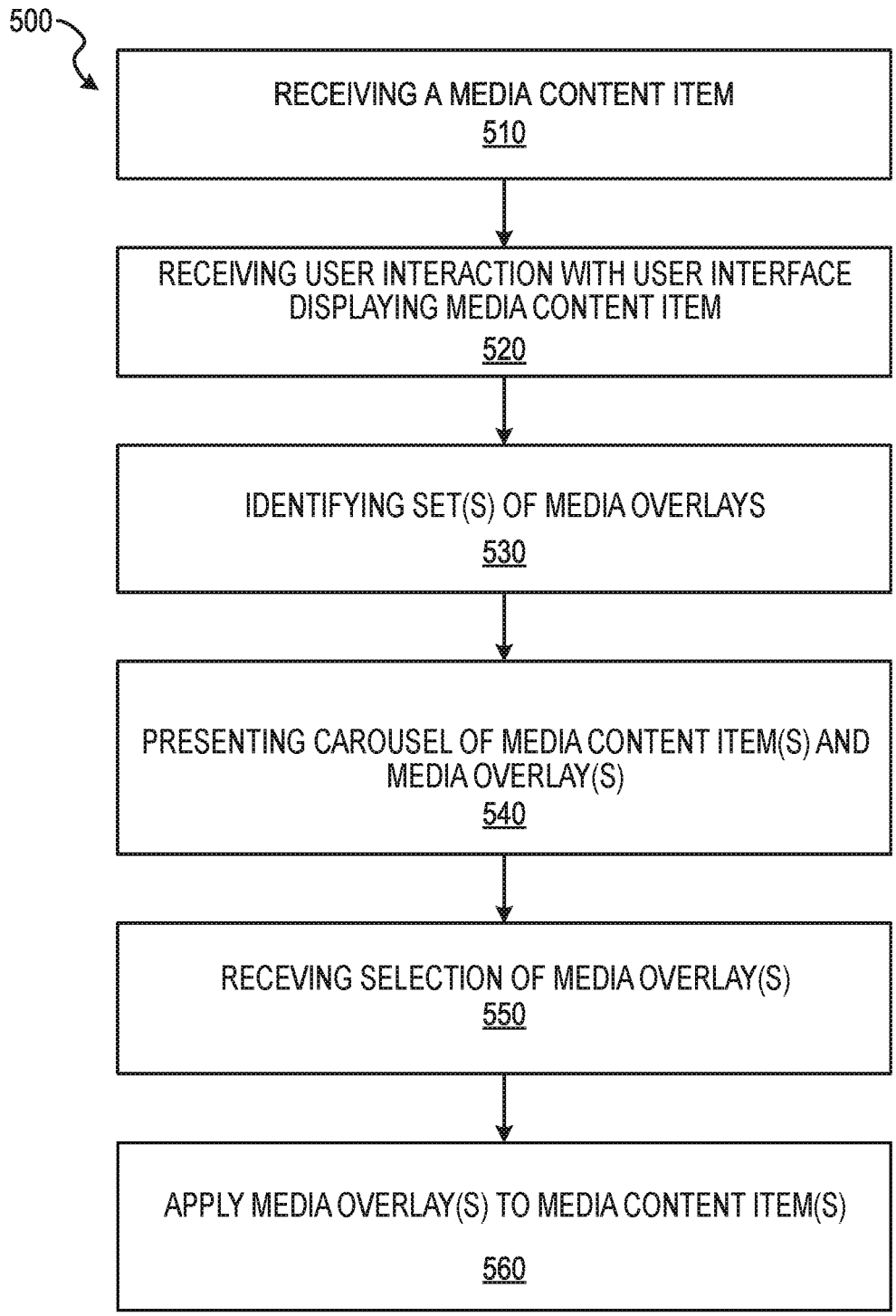
FIG. 5 is a flow diagram illustrating an exemplary method for presenting an image modifier within a user interface from a plurality of sets of image modifiers, according to some exemplary embodiments.

FIG. 5 depicts a flow diagram illustrating an exemplary method 500 for presenting an image modifier within a user interface from a plurality of sets of image modifiers, according to various exemplary embodiments. In some embodiments, image capture system 160 presents one or more image modifiers within a user interface using a modifier carousel. Image capture system 160 can maximize the use of image modifiers via a modifier carousel in response to optimizing position of image modifiers within the media carousel. The image capture system 160 may use information gathered from user interactions with a computing device, information sensed or received by the computing device independent of user interaction, aspects or depictions within a field of view presented at the computing device, location, and any other suitable information in attempt to determine an ordering within a group of image modifiers, and ordering between groups of image modifiers, or combinations thereof in the modifier carousel. In these embodiments, the image capture system 160 attempts to surface and order appropriate image modifiers anticipating a user's desired purpose with a media content item. The operations of method 500 may be performed by components of the image capture system 160, and are so described for purposes of illustration.

In operation 510, image capture system 160 receives a media content item. Image capture system 160 can receive a variety of media content items from a variety of sources. In this context, a "media content item" may include any type of electronic media in any format. For example, a media content item may include an image in JPG format, an image in PNG format, a video in FLV format, a video in AVI format, etc. In some exemplary embodiments, a media content item is captured by image capture system 160 using an image capture device. Additionally or alternatively, the media content item may be received from another system or device. In FIG. 1, for example, a client device 110 performing the functionality of method 500 may receive a media content item from social messaging system 130, third party server(s) 120, or other system via network 104.

Figure 6:
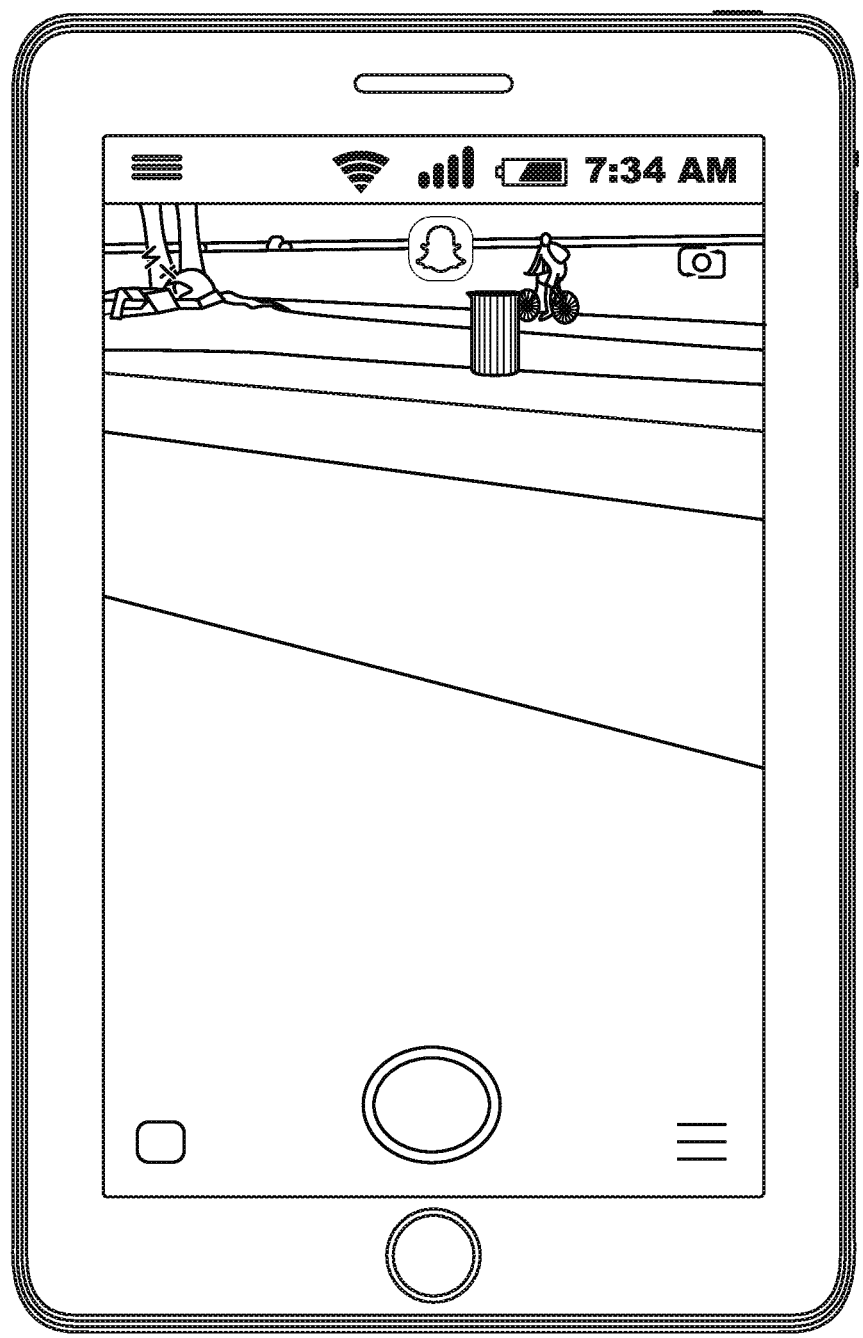
FIG. 6 is a user interface diagram depicting the image capture system in operation, according to some exemplary embodiments.

As shown in FIG. 6, an image, video stream, or real time field of view of image capture device 160 is initially presented depicting a portion of a ground.

In operation 520, image capture system 160 receives a user interaction with a user interface of a display device associated with the image capture system 160 displaying the media content item. In some instances, the user interaction represents one or more predetermined gestures. Some examples of gestures are taps, double taps, flicks, drags, pinches, touch and holds. The user interaction may also indicate a region of, area, or portion of the field of view of an image capture device. In some embodiments, the user interaction indicates an object of interest (e.g., a person's face) depicted within the field of view of the image capture device. In some instances, the position of the user interaction corresponds to an object of interest, element, visual feature, physical object, aspect of scenery, or ambient aspect in the real world which is depicted within the image, video stream, or real time field of view of the image capture device presented within the user interface displayed on the computing device.

In some embodiments, image capture system 160 can receive the user interaction relative to a user interface rendered with a display of the received media content item. The user interface additionally can include a set of user interface elements. The set of interface elements may include a set of icons, buttons, logos, or other graphical representations. Each interface element may be associated with discrete user functions. For example, the user interface may include user interface elements including a flash indicator, a home icon, a camera selection icon, an image capture icon, a history icon, a chat icon, a story icon, and any other suitable icon or graphical representation. The user interface elements are selectable to cause one or more of the components of the image capture device 160 to perform a variety functions. For example, the flash indicator may be selectable to enable a flash discharge proximate to capturing an image or precluding a flash discharge. The home icon may be selectable to cause image capture system 160 to display a menu, account aspects, or any other suitable combination of user interface display and user interface elements (e.g., selectable icons).

In some embodiments, image capture system 160 can receive the first user interface relative to a modifier carousel rendered with a display of the received media content item. The modifier carousel can include a set of user interface elements. The set of interface elements may include a set of icons, buttons, logos, or other graphical representations. Each interface element may be associated with discrete image modifiers or a set of image modifiers.

In response to receiving the user interaction with respect to the user interface, components of the image capture system 160 may determine a modifier context based at least in part on the characteristics of the user interaction in some embodiments. The characteristics of a user interaction may be aspects of the interaction itself. In some instances, the characteristics of the user interaction are information determined at the time of the user interaction. The characteristics may also be information associated with the computing device or the image capture device captured, determined, or sensed contemporaneous to receiving the user interaction.

In some instances, the identified modifier context may be understood as a determination of an intent of the user with respect to the media content item. Components of the image capture system 160 may identify a modifier category (e.g., a filter category, a lens category, or a category for a set of add-on graphical elements). In some instances, to determine the modifier context, components of the image capture system 160 perform one or more sub-operations. In some embodiments, components of the image capture system 160 identify one or more context indicators. After determining the context indicators, the image capture system 160 determines the modifier context based on the selection, the positions of the selection, and the one or more context indicators.

In some instances a context indicator may be user interface information, device information, or other information indicating a suggested context of modifier usage. In some embodiments the context indicator may comprise any one or more of a geolocation of the computing device; a time of day; a set of weather data; a face depicted within the field of view; a plurality of faces depicted within the field of view; a specified person of a set of predetermined people depicted within the field of view; a natural feature tracking identification; a representative symbol identifying an entity, an event, or a product; a sponsorship; an orientation of the computing device; a movement of the computing device; an object type depicted within the field of view; an unlock code applied to a specified modifier; an image capture device position relative to the computing device; a modifier popularity score; and combinations thereof.

In embodiments where components of the image capture system 160 determine and identify objects of interest within the field of view, the image capture system 160 determines the modifier context based on the user interaction, the characteristics of the interaction within the user interface, and the identification of an object of interest. Where the image capture system 160 determines and identifies a plurality of objects of interest, the image capture system 160 determines the modifier context based on the user interaction, the characteristics of the interaction, and the identifications of at least one of the plurality of objects of interest.

Figure 7:
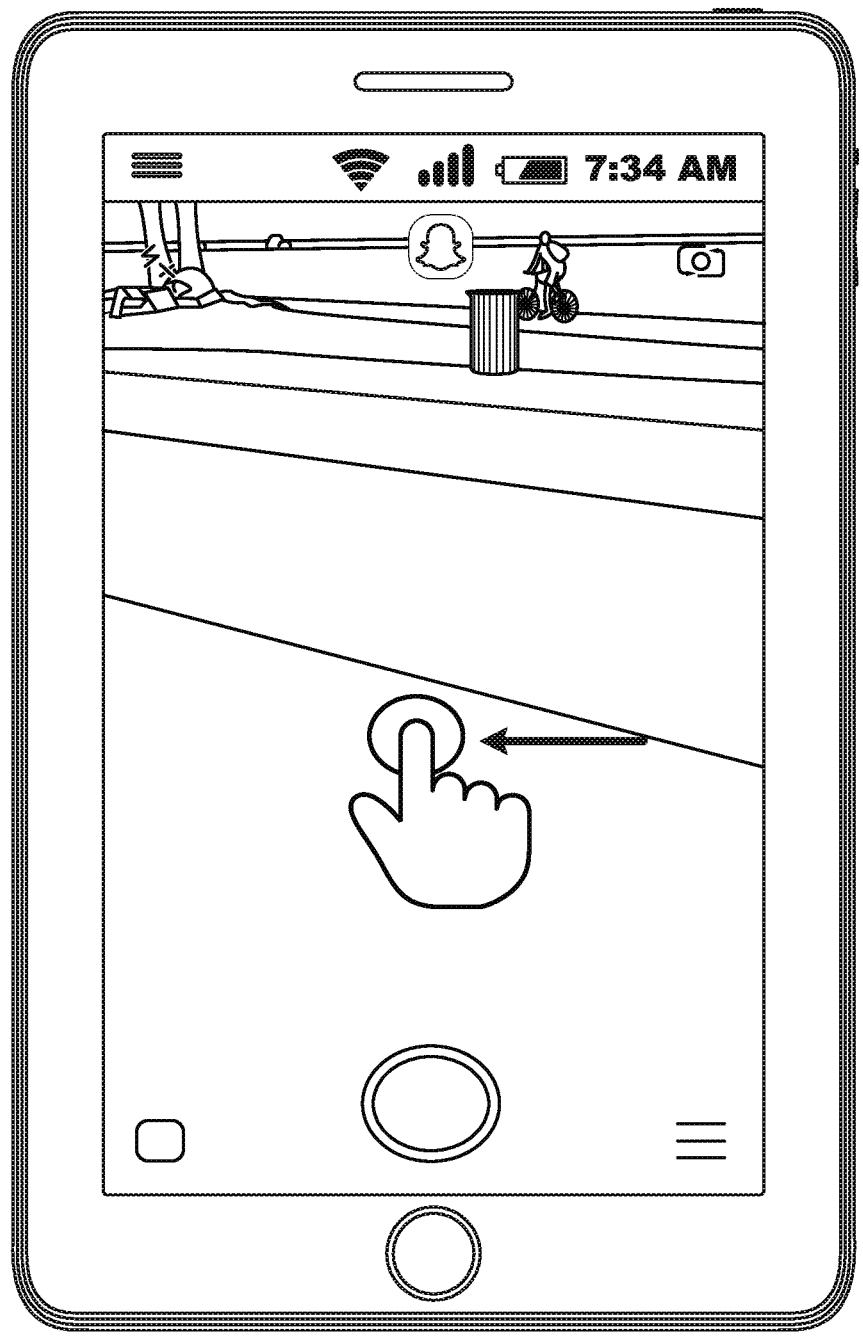
FIG. 7 is a user interface diagram depicting the image capture system in operation, according to some exemplary embodiments.

In some instances, as shown in FIGS. 6 and 7, the user interaction received in operation 520 indicates motion to display a prioritized list of image modifiers. In FIG. 7, a user interaction is made by swiping, flicking, dragging, or other indication of motion to the left relative to the user interface.

Referring again to FIG. 5, in operation 530, image capture system 160 identifies at least one set of image modifiers/media overlays/filters, etc. based on the user interaction and an ordering of a plurality of sets of image modifiers. Components of image capture system 160 make one or more determinations to identify the at least one set of image modifiers from many sets. Image capture system 160 may take into account availability, relevancy, priority, and performance of image modifiers within each of a plurality of sets of image modifiers to create an ordering between each of the plurality of sets of image modifiers. Components of image capture system 160 can create the ordering offline or in real-time using a variety of criteria that quantify aspects of image modifiers, such as availability, relevancy, priority, and performance referenced above.

With an increased number of image modifiers available to messaging client application 300 (e.g., though publication features of annotation system 306), component of image capture system 160 can optimize delivery of individual image modifiers or groups of image modifiers to client devices as image modifiers may be preordered or presorted. Optimized delivery of image modifiers can improve responsiveness of the client devices as well as manage device storage.

An image modifier (also referred to herein as a filter or media overlay) can include an image filter, a digital lens, a set of add-on graphical elements, or any other suitable visual effect or modification which may be applied to at least a portion of an image, video stream, or real time or live field of view of an image capture device. An image modifier can also include an icon or other visual representation of the image modifier.

A set of image modifiers can include any number of image modifiers. Image modifiers in a set may be ordered, ranked, prioritized, or otherwise organized according to one or more predetermined criteria. Each set of image modifiers in a plurality of sets of image modifiers may be ordered, ranked, prioritized, or otherwise organized according to one or more predetermined criteria. Each set of image modifiers may comprise any number of distinct image modifiers, any number of related image modifiers, or any number of miscellaneous image modifiers. Image modifiers may be organized, prioritized, or otherwise arrangement in each set according to type, category, usage, etc.

In some instances, the image capture system 160 identifies the set of image modifiers by comparing or matching the identified modifier context (e.g., an identified lens, modifier, or filter category or activator type) discussed above to a category associated with one or more image modifiers in the set of image modifiers. In some instances, the image capture system 160 identifies the set of image modifiers as a set of image modifiers having a common modifier category or a set of related modifier categories. In some embodiments, the image capture system 160 creates the set of image modifiers dynamically, composing the set of image modifiers based on individually identifying one or more image modifiers based on the modifier context.

In some embodiments, each image modifier is associated with at least one category. Categories may be modifier contexts or may be a category label associated with at least one modifier context. In some instances, categories are descriptive identifiers common to image modifiers included within a specified set. For example, categories may include face modifiers, atmospheric modifiers, ground modifiers, face swapping modifiers, emotion modifiers, costume modifiers, or any other suitable categorical organization and description of an image modifier. Where new image modifiers are added to the image capture system 160 for incorporation into a set of image modifiers, the image modifier is received (e.g., downloaded) by the image capture system 160. The image modifier is associated with at least one filter category indicating at least one context indicator triggering identification of the image modifier. In some instances, the context indicator may be the modifier context.

In some embodiments, categories may include a first category and a second category. The first category indicates a primary context indicator associated with the category. The second category indicates a secondary context indicator associated with the category. The set of image modifiers may be identified and selected upon detection of one or more of the first category and the second category.

In operation 530, image capture system 160 identifies at least one image modifier in the identified set of image modifiers based on an ordering of image modifiers for the identified set of image modifiers. Components of image capture system 160 again may make one or more determinations to identify the at least one image modifier taking into account availability, relevancy, priority, and performance of image modifiers within the identified set of image modifiers.

Each image modifier in the identified set of image modifiers may be organized, prioritized, or otherwise arranged according to a ranking, scoring, or other evaluation. In some embodiments, image capture system 160 implements an ordering algorithm that considers how many times an image modifier is used, how many times an image modifier is ignored, when an image modifier is used, when an image modifier is ignored, a usage context, location of where the image modifier can or cannot be used, user profile information, graphs of a user's social connections, and the like.

Components of image capture system 160 may select the highest ranked image modifier in the identified set of image modifiers in one or more categories as the identified at least one image modifier. In some embodiments, components of image capture system 160 can select image modifiers that satisfy multiple orderings. Certain categories of image modifiers can be prioritized over others based on date, time, location, and the like. In certain aspects, sponsored content can be prioritized over other levels of content.

In response to identifying the set of image modifiers, components of the image capture system 160 can determine an order for the set filters based on the modifier context in some embodiments. An image modifier may have a primary modifier category and one or more secondary modifier categories. The primary modifier category is the modifier category of the modifier and the one or more secondary modifier category indicates modifier categories with which the modifier may be compatible. The primary modifier category may be related to the secondary modifier categories, such that the primary modifier category indicates the one or more secondary modifier categories which are compatible with the first modifier category. In these instances, modifiers having a primary category which matches the modifier context are ordered first. For example, with modifier categories including selfie, air, ground, logo, and mural, each category may define one or more other categories compatible with the specified category. Further, the interrelation of categories may be used to surface the order of modifiers.

In some embodiments, image modifiers within a modifier category group are ordered according to a set of rules. The set of rules may comprise a priority determination, a sponsorship determination, and an unlock determination. The priority determination may be determined using a priority value assigned to each modifier. For example, a sponsorship determination may assign a modifier a priority value of zero, indicating a highest priority, such that a sponsored modifier appears first in the order. The unlock determination may receive a second priority value, such that after scanning or inputting a code to unlock a modifier, where the unlocked modifier is surfaced for inclusion in the set of modifiers, the unlocked modifier is presented at a position after a sponsored modifier, but before other modifiers which are neither sponsored or unlocked. In some instances, geolocation is used to unlock a modifier. In these instances, a geolocation modifier may be treated as an unlocked modifier. Although described with respect to an exemplary set of rules, it should be understood that any number or relation of rules may be used such as rules for logos, geolocation, weather, multiple objects, and other suitable rules.

In some instances, the image capture system 160 surfaces (i.e., presents/displays) and orders multiple sets of image modifiers (e.g., each set of image modifiers associated with a distinct modifier category). The image capture system 160 may surface up to a predetermined number of image modifiers per set of image modifiers. For example, where three sets of image modifiers are surfaced, each associated with a different modifier category, a first set of image modifiers may include X image modifiers, a second set of image modifiers may include Y image modifiers, and a third set of image modifiers may include Z image modifiers. In some instances, X, Y, and Z are the same number. Where a modifier category includes a lower number of image modifiers, two or more of the sets of image modifiers may include the same number of image modifiers, while the third set of image modifiers includes a lower number of image modifiers.

In embodiments where the image capture system 160 identifies a first set of image modifiers and a second set of image modifiers, the image capture device 160 determines the order for the first set of image modifiers and the second set of image modifiers. In some instances, the order determines the placement of the image modifiers of the first set of image modifiers with respect to the image modifiers of the second set of image modifiers. In some embodiments, the order determines an order for image modifiers within each set. In these instances, image modifiers within a set of image modifiers may be reordered or repositioned based on the modifier context.

In some instances, image modifiers may be associated with more than one modifier category. Where two or more modifier categories cause a single image modifiers to be included in two or more sets of image modifiers surfaced by the image capture system 160, the image capture system 160 may eliminate the image modifiers from one or more sets of image modifiers based on the modifier context.

Figure 8:
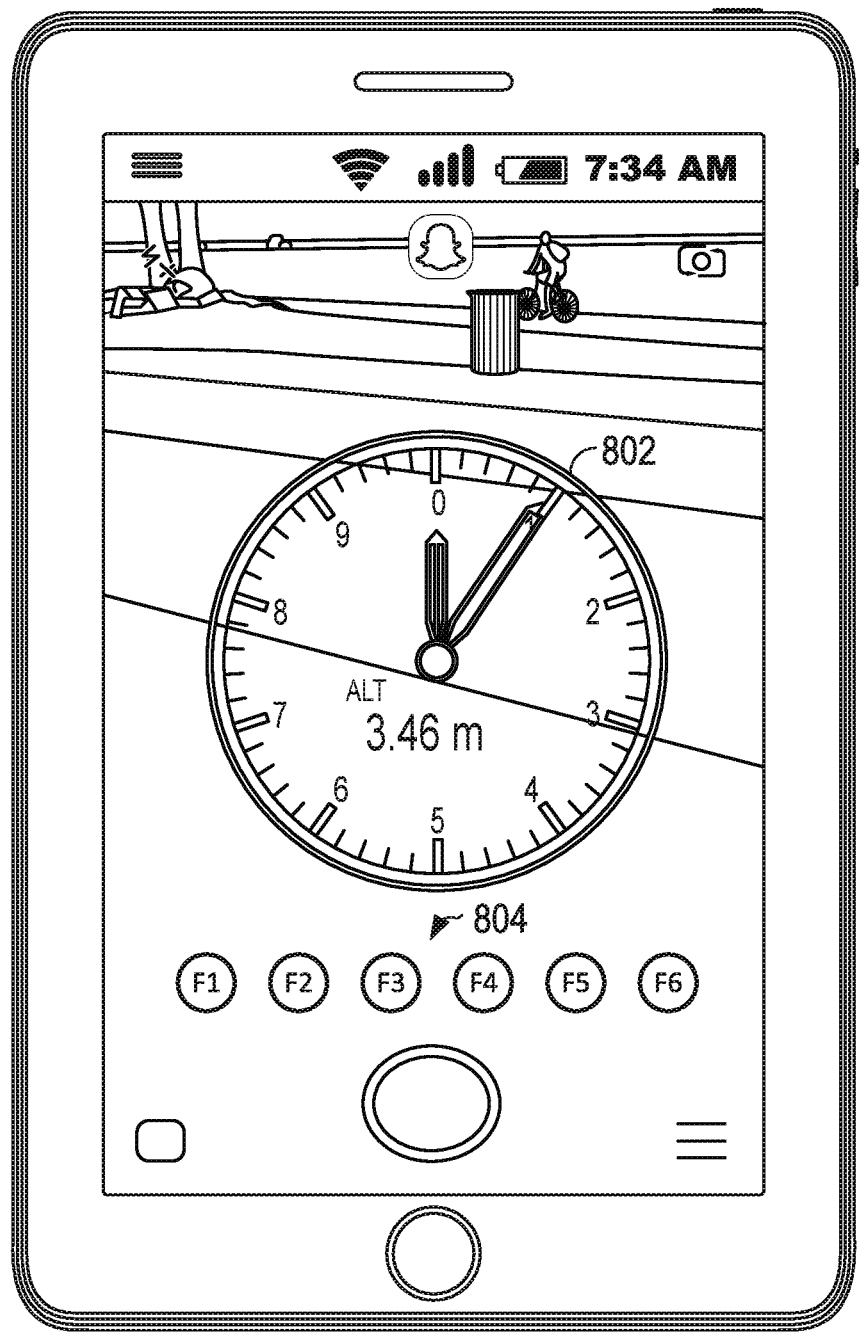
FIG. 8 is a user interface diagram depicting the image capture system in operation, according to some exemplary embodiments.

In operation 540, presentation component 270 generates a representation of the media content item and the identified image modifier. The representation generated of the media content item and the identified image modifier can include a merging of two sources or an overlay of two sources. As shown in FIG. 8, an image modifier 802 indicative of the altitude of the user's device is displayed together with the view of the street.

In some exemplary embodiments, the representation includes a modifier carousel. The modifier carousel includes one or more visual elements which through interaction of the user selects (550) one or more image modifiers. The modifier carousel can include a plurality of icons or other visual representations of remaining image modifiers in the identified set of image modifiers.

The modifier carousel can be presented (540) within the user interface with search functionality to enable a user to identify and select (550) a specified or desired image modifier. In some instances, the search functionality is enabled using a search icon placed within the modifier carousel and among the modifier icons. The search icon depicts an indication of search functionality, such as a question mark or other graphical representation of search functionality. In some instances, the search icon is positioned within the modifier carousel according to an order specified for the modifier icons, described in more detail below. In some embodiments, the search icon is presented at the end of the set of modifier icons included in the modifier carousel and presented according to a specified order. In some instances, the search icon is positioned at the front or beginning of the ordered set of modifier icons. In exemplary embodiments, the search icon is presented outside of the modifier carousel. For example, in some instances, the modifier carousel is presented on a right hand side of an image capture element and, once selected, a modifier icon is positioned inside the image capture element. In such instances, the search icon may be presented on a left hand side of the image capture element. In some exemplary embodiments, the search icon is presented proximate to the image capture element. In some instances, the search icon is presented a distance apart from the image capture element, such that at least one modifier icon occurring before a selected modifier icon in the ordered set of icons is presented proximate to the image capture element on a side of the image capture element opposite the modifier icons occurring after the selected modifier icon in the ordered set of modifier icons. In some instances, the search icon is presented in a plane apart from the modifier icons presented in the modifier carousel. For example, the search icon may be presented above or below the image capture element, when the modifier icons of the modifier carousel are presented in a horizontal line of a plane including the image capture element.

In some embodiments, the modifier carousel can include the modifier icons for the set of modifiers within the user interface. The modifier icons are presented as selectable user interface elements within the user interface. In some embodiments, the modifier icons are positioned in a portion of the user interface outside of the field of view of the image capture device included within the user interface. In some instances, the modifier icons are positioned within a portion of the field of view of the image capture device. As shown in FIG. 8, modifier carousel 804 includes a plurality of modifier icons presented proximate to an image capture element.

As shown in FIG. 8, in some embodiments, selection or manipulation of media carousel 804 causes one or more modifier icons to be displaced from a first position and moved to a second positions. In embodiments where the image capture system 160 identifies and orders a plurality of image modifiers (e.g., a first image modifier and a second image modifier), the image capture system 160 causes display of media carousel 804 with at least a portion of image modifiers from the identified set of image modifiers that includes modifier icons for the first and second image modifiers. In embodiments where the image capture system 160 identifies and orders a plurality of sets of image modifiers (e.g., a first set of image modifiers and a second set of image modifiers), the image capture system 160 causes display of media carousel 804 with at least a portion of the plurality of sets of image modifiers. For example, where the image capture system 160 identifies a first set of image modifiers and a second set of image modifiers, the image capture system 160 causes presentation in the media carousel 804 of a first set of modifier icons and at least a portion of a second set of modifier icons. Each modifier icon of the first set of modifier icons corresponds to an image modifier of the first set of image modifiers. Each modifier icon of the second set of modifier icons corresponds to an image modifier of the second set of image modifiers. In some embodiments, the combination of first set of modifier icons and second set of modifier icons are presented according to a determined ordering. In some instances, the ordering defines an organization and presentation scheme for positioning image modifiers within each set of image modifiers.

In operation 560, components of image capture system 160 applies the image modifier associated with the modifier icon indicated by the selection of the media overlay/image modifier in step 550. The system 160 may receive (550) and apply (560) multiple media overlays/image modifiers to the same media content item simultaneously.

In some embodiments, the image capture system 160 determines a first object category associated with a first object of interest and a second object category associated with a second object of interest identifier using the second user interaction. The first object of interest may be used, at least in part, to determine the modifier category. The image capture system 160 determines the modifier category corresponds to the second object category. In this instance, the selected modifier corresponds to an object of interest depicted in the field of view which is different than the object of interest used to identify the modifiers for display. Upon determining the modifier category corresponds to the second object category, the image capture system 160 generates a representation graphic (e.g., a mesh) indicating the second object of interest identified within the field of view of the image capture device.

In some instances, the user interface is divided among differing display areas. The display areas may correspond to specified interaction operations suitable for the display area. For example, a portion of the user interface may be limited to interaction with lenses, modifiers, or filters, after a set of modifiers or a portion of a set of modifiers has been displayed. A portion of the user interface may be configured to change modes of operation between image capture, display, playback, and other suitable operative modes. In some instances, specified user interactions may be allowed in any area of the user interface. For example, in some instances a double tap within the user interface may cause the computing device to switch image capture input (e.g., switching between image capture devices forward and rear). By way of further example, a single tap may capture a still image, while a sustained touch may capture a video. Further examples include a tap, causing the image capture device to focus the field of view on the tapped location.

After selection of an image modifier using the second user interaction, a subsequent user interaction may perform one or more further operations. In some embodiments, a subsequent selection causing a change from a front facing image capture device to a rear facing image capture device. The modifier carousel may retain the modifiers presented within the modifier carousel, as determined in the method 500. The identifier image modifier in the changed image capture mode may operate as normal or previously operable. Embodiments of the disclosure may display a previously-displayed carousel of media overlays/image modifiers with any other subsequently-received media content items. For example, similar to maintaining the carousel from a front facing image to a rear facing image, the system may display the carousel in conjunction with a first media content item (e.g., a still image or recorded video) and continue displaying the same carousel of media overlays when a second media content item is received (e.g., as the user selects different images from a gallery).

A modifier context may cause subsequent selections to operate differently where the subsequent selection causes a change in the modifier context or indicates a combined context. For example, where a face and air lens (e.g., causing modification of both a face and air or an atmosphere around the face) is operating and a subsequent selection causes a change from a front image capture device to a rear image capture device, the field of view may be modified to represent an active view of the previously selected modifier (e.g., lens, filter, or set of add-on graphical elements). For example, if a user has selected a modifier generating an overlay of an old man smoking modifying a face depicted within the field of view, a subsequent selection may change the camera view from the front image capture device to a rear image capture device. Upon change in the camera view, the field of view of the currently operative image capture device is presented in the context of the old man smoking, acting as a first person point of view. In these instances, the modifier carousel may remain in an unaltered state, prior to the subsequent selection.

In certain embodiments, selection (e.g., tapping) of a modifier icon may move the modifier icon in modifier carousel 804 from a first position (positioned a distance away from the image capture element) to a second position. The second position may be proximate to the image capture element or may be positioned within the image capture element. In some instances, the modifier icons are sized such that the modifier icon may be positioned within an interior portion of the image capture element. Although the modifier icons are shown as being aligned in a plane containing the image capture icon and extending away from the image capture element in one or more directions, it should be understood that differing presentations may also be used. For example, the modifier icons may be positioned around the image capture element, extending radially outward therefrom. By way of further example, the modifier icons may be presented in a movable line above or below the image capture element.

D. Ranking and Organization

Embodiments of the present disclosure may maximize user of image modifiers via ordering of the positions of image modifiers in a modifier carousel displayed within a user interface of a computing device. The modifier carousel can display modifier icons or other visual representations of image modifiers. Image modifiers can be organized within the modifier carousel according to type, availability, priority, usage, ranking, scoring, and the like. Image capture system 160 optimizing presentation of modifier icons using intra-section ordering, inter-section ordering, and cross-section ordering in some embodiments.

Intra-section ordering as used herein means changing the order of image modifiers in a particular image modifier section or grouping. A change can include a positional change of one or more image modifiers within the section. Inter-section ordering as used herein means changing the order of an entire section or group. A change can include a positional change of one or more sections within an ordering of a plurality of sections. For example, an entire section of image modifiers is moved from one position to another in the modifier carousel. Cross-section ordering as used herein means changing the order of an image modifier in one section and the order of the image modifier in another section. A change can include a positional change of moving a single image modifier out of its initial section to a position in another section.

In some embodiments, image capture system 160 implements a pointwise ranking approve to hand intra-sectional, inter-sectional, and cross-sectional ordering. Image capture system 160 can therefore merge and sort arbitrary sets of scored elements (i.e., image modifiers and sections/groups). Image capture system 160 can include a pre-cache subsystem that provides merging and ordering of image modifiers in a cache subsystem that makes image modifiers available to client device 110. Given a scenario of image modifiers with associated priority {f1: 90, f2: 80, f3: 30}, the ordering can be merged with data received from another source {f4: 50} to sort and generate an ordered list {f1: 90, f2: 80, f4: 50, f3: 30. Pointwise provides an easy to debug score (e.g., Why one image modifier is showing over another?, Why is this image modifier showing first? because its scored 0.9 vs another that is 0.8). Pointwise also allows a specific a-priori "hand-picked" custom scores if necessary. This can enable a scenario where to explicitly force image modifier to specific position, such as when requested by design/partnerships etc.

In some embodiments, image capture system 160 implements a pairwise ranking methodologies. This can require a client to either compute or cache all pairwise comparison—even for image modifiers later to be delivered. However, pairwise ranking are not bound to a single dimension in which to order image modifiers and this can use multiple dimensions.

To implement intra-section rank evaluations, image capture system 160 may employ a modified mean reciprocal rank (MMR), which is built for single selection use ranked lists. In general, mean reciprocal rank is a statistic measure for evaluating any process that produces a list of possible responses to a sample of queries, ordered by probability of correctness. The reciprocal rank of a query response is the multiplicative inverse of the rank of the first correct answer. The mean reciprocal rank is the average of the reciprocal ranks of results for a sample of queries Q:

$$MRR = \frac{1}{|Q|}\sum_{i=1}^{|Q|}\frac{1}{\text{rank}}$$

The MRR can be modified to account for a binary signal allowing use in top k given more than k filters available. This goal maps pretty well to as optimization criteria. Certain event can be chosen and multiple values tracked (e.g., k=2 or k=3) to determine whether there is any improvement. Additionally, MRR in scenarios where there are more than k filters swiped over can be prioritized. A use in the top k given 4 or 40 filters available can limit further tracking.

To implement inter-section rank evaluations, image capture system 160 may account for key differences between intra-section and inter-section scenarios. The key differences between inter and intra section scenarios can include the fact that inter-section ordering has about 20× the daily signal (~15M vs ~300M) giving a clearer opportunity for large gains in improvement. Another can include where some users already have expectations for section ordering. Finally, it is technically possible for a user to apply multiple image modifiers. In this situation, image capture system 160 can either mark the session as dirty or treat each application in the session separately.

Image capture system 160 can, given an ordering of sections {s1, s2, s3, s4, s5} and receiving an interaction by a user who selects one or zero image modifiers to put on a media content item, evaluate the ordering. First, image capture system 160 can maximize global filter use to swipe (conversion). Second, MRR can be applied where, unlike the inter-section ranking scenario, a fixed number of sections are usually limited in the modifier carousel (e.g., for video and motion). Third, mean average position (MAP) can be applied where it's possible to apply many filters from different sections. Image capture system 160 can compute the average precision over the whole modifier carousel.

To implement cross-section rank evaluations, image capture system 160 may simplify to an isomorphic problem to the intra-section ranking scenario and evaluated in a similar manner.

Image capture system 160 can use the following metrics to rank image modifiers in different dimensions:

Total number of snaps taken/sent (tracks overall app engagement).

Total number swipes into the modifier carousel (track impact on carousel awareness).

Total number of swipes (tracks/confirms user access to image modifiers). Image capture device 160 can track a sequence of swipes the user take to arrive at a selection or application event. Image capture device 160 can determine which image modifiers were seen vs not seen and in what order.

Total number of image modifiers applied (aka uses) (tracks impact on overall carousel engagement—and breakdown by category).

Total filter conversion rate (tracks global relevance of carousel to a media content item, choose filter|swiped over filter).

Sponsored impressions (swipe/use/view)(tracks potential impact on monetizable metrics).

Sponsored reach (Uniques)(tracks potential impact on image modifiers as a brand awareness tool).

Image capture system 160 can determine a score for an image modifier providing a notion on the client device 110 associated with the order of the image modifier in the modifier carousel. Image capture system 160 can update use (send/post) and swipe (filter/geofilter/direction/sequence) metrics to have a 'filter_score' associated with the ordering. Since users at different times will potentially have different scores, image capture system 160 can log the scores on the swipe to prevent having to do a posterior join against multiple different sources.

In some embodiments, image capture system 160 creates an "order key space," for example, between 0 and 10,000. Each image modifier can be mapped to any number in the key space. Further, each image modifier can be assigned a relative "score" which combined with a base "filter category" score correlates to a position in the key space.

FIG. 9 is a table 900 illustrating an exemplary base score arrangement in several embodiments. Upon receiving the user interaction with respect to the user interface displaying the media content items, image capture system 160 can sort image modifiers by score and load selected filters into the modifier carousel. In the event an image modifier is loaded into the modifier carousel dynamically and after the user interaction, image capture system 160 can mark the session as "dirty' limiting further rank modification of certain image modifiers.

Figure 10:
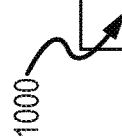
FIG. 10 is a table 1000 illustrating an exemplary default score arrangement used by the image capture device in operation, in several embodiments.

FIG. 10 is a table 1000 illustrating an exemplary default score arrangement in several embodiments. In various embodiments, image capture system 160 can apply a set of rules or implement machine learning to determine how to change the total score of each image modifier. Image capture system 160 may determine different relative scores providing dynamic changes in the modifier carousel for intra-section rankings. Image capture system 160 may determine different base scores providing dynamic changes in the modifier carousel for inter-section rankings. Image capture system 160 may assign a different category or assign a different base score as an existing category providing dynamic changes in the modifier carousel for cross-section rankings.

Image capture system 160 may receive instructions from social messaging system 130 that specify filter type base score overrides that, for example, move an image modifier's base score from 0 to 3000. Image capture system 160 may receive instructions from social messaging system 130 that specify individual filter scores (i.e., Face smoothing filter is scored at −1 so that its aggregate score becomes 7999 and it the last visual filter ordered going left to right). Thus, the default key space maintained by a client device can be dynamically overridable via social messaging system 130.

In some embodiments, the identification and ordering of image modifiers included in the one or more set of modifiers uses a user intent as a primary ordering mechanism and includes additional image modifiers appended to the end of the set of modifiers. For example, the intent of the user may be a primary ordering characteristic. In this example, receiving a selection of the sky in a field of view of the image capture device causes the image capture system 160 to select and order modifiers for the sky first in the modifier carousel. Filters surfaced according to the primary ordering characteristic may be primary intent modifiers $X_1$-$X_n$. The image capture system 160 appends additional modifiers to the end of the ordered list of primary intent modifiers $X_1$-$X_n$. For example, selecting a logo may cause the image capture system 160 to surface modifiers associated with the logo as well as world modifiers. World modifiers may be surfaced to increase discoverability of other modifiers in the image capture system 160 and to provide a consistent user interface experience.

In these embodiments, the set of image modifiers and order of the image modifiers may be determined first using an indication of user intent, surfacing and prioritizing primary intent modifiers, described above. In some instances, the primary intent modifiers may be surfaced and ordered in a manner similar to or the same as described for operations 430 and 440. The image capture system 160, in ordering the image modifiers, may determine whether the set of image modifiers includes an image modifier associated with a specific geolocation and place the geolocation modifier in a first position. Where the set of image modifiers also includes a sponsored modifier, the sponsored modifier may be placed in a second position. The remaining image modifiers of the set of image modifiers may be positioned in positioned occurring after the sponsored modifier. The remaining image modifiers may be ordered using a ranking algorithm such as newest first, a popularity based ordering algorithm, a characteristic based ordering algorithm, or any other suitable ranking or ordering scheme. After a final image modifiers in the set of image modifiers, the image capture system 160 may append one or more world modifiers. The world modifiers may be ordered using the same or similar rules for ordering modifiers as described above. In some instances image modifiers triggered by selection on a logo or other explicitly identified mark or representation may be included in the group of appended world modifiers where the image modifiers satisfies a geolocation element.

E. Prioritized Filter Delivery

In various embodiments, social messaging system 130 can prioritize deliver of image modifiers to image capture system 160 thus optimizing delivery based on relevance/performance. Social messaging system 130 can ensure that all users within the same geofence have access to the same set of image modifiers.

F. Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various exemplary embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of exemplary methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein.

As used herein. "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some exemplary embodiments, the processors or processor-implemented components are located in a single geographic location (e.g., within a home environment, an office environment, or a server farm). In other exemplary embodiments, the processors or processor-implemented components are distributed across a number of geographic locations.

G. Applications

Figure 11:
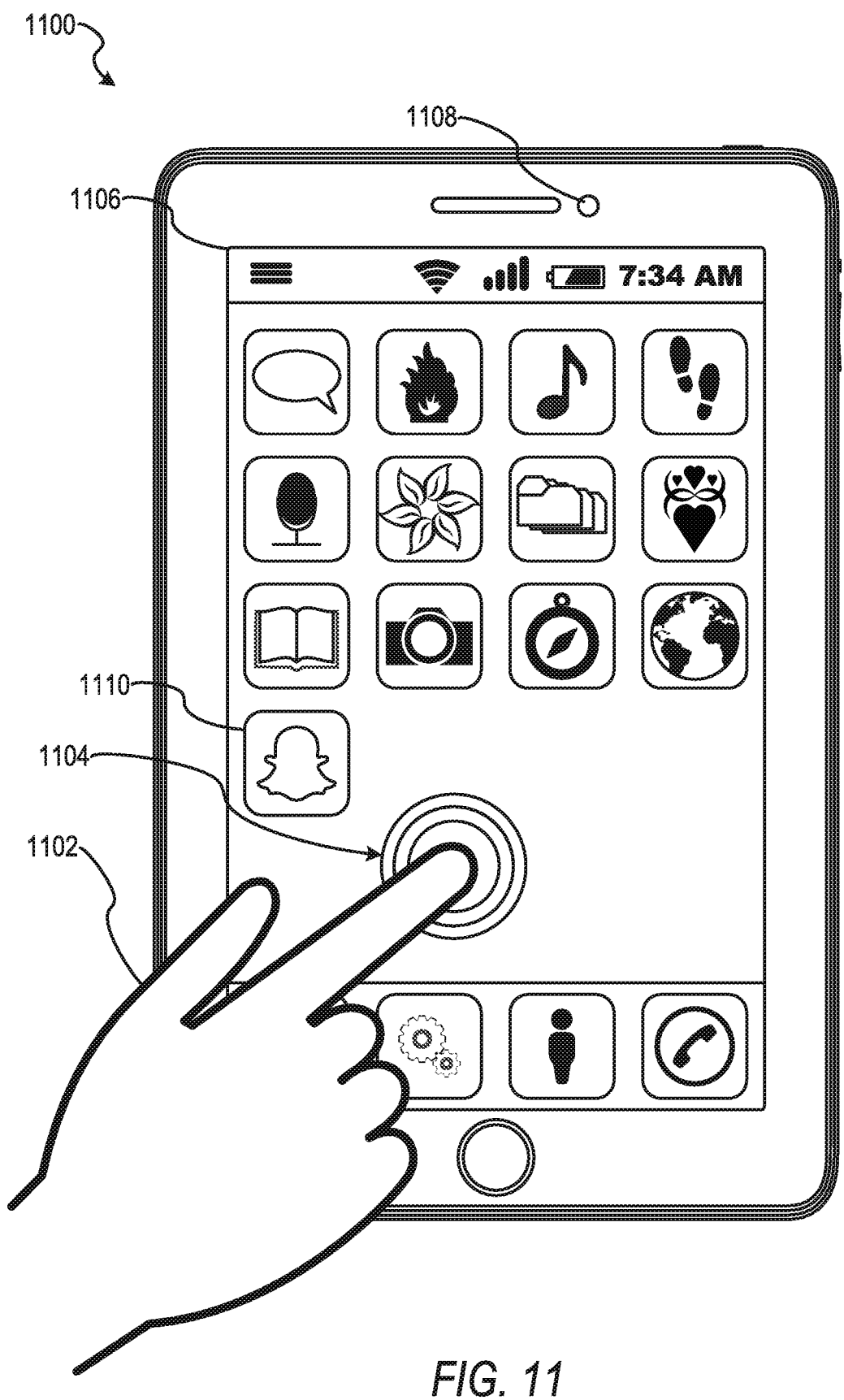
FIG. 11 is a user interface diagram depicting an exemplary mobile device and mobile operating system interface, according to some exemplary embodiments.

FIG. 11 illustrates an exemplary mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various exemplary embodiments, the mobile device 1100 displays a home screen 1106 (e.g., Springboard on IOS™) operable to launch applications or otherwise manage various aspects of the mobile device 1100. In some exemplary embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon.

The mobile device 1100, as shown in FIG. 11, includes an imaging device 1108. The imaging device may be a camera or any other device coupled to the mobile device 1100 capable of capturing a video stream or one or more successive images. The imaging device 1108 may be triggered by the image capture system 160 or a selectable user interface element to initiate capture of a video stream or succession of frames and pass the video stream or succession of images to the image capture system 160 for processing according to the one or more methods described in the present disclosure.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1110 such as SNAPCHAT® that, consistent with some embodiments, allows users to exchange ephemeral messages that include media content. In this example, the social messaging app 1110 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the image capture system 160 may identify, track, extract, and generate representations of a face within the ephemeral video clip, as the ephemeral video clip is being captured by the device and transmit the ephemeral video clip to another device using the ephemeral message system.

H. Software Architecture

Figure 12:
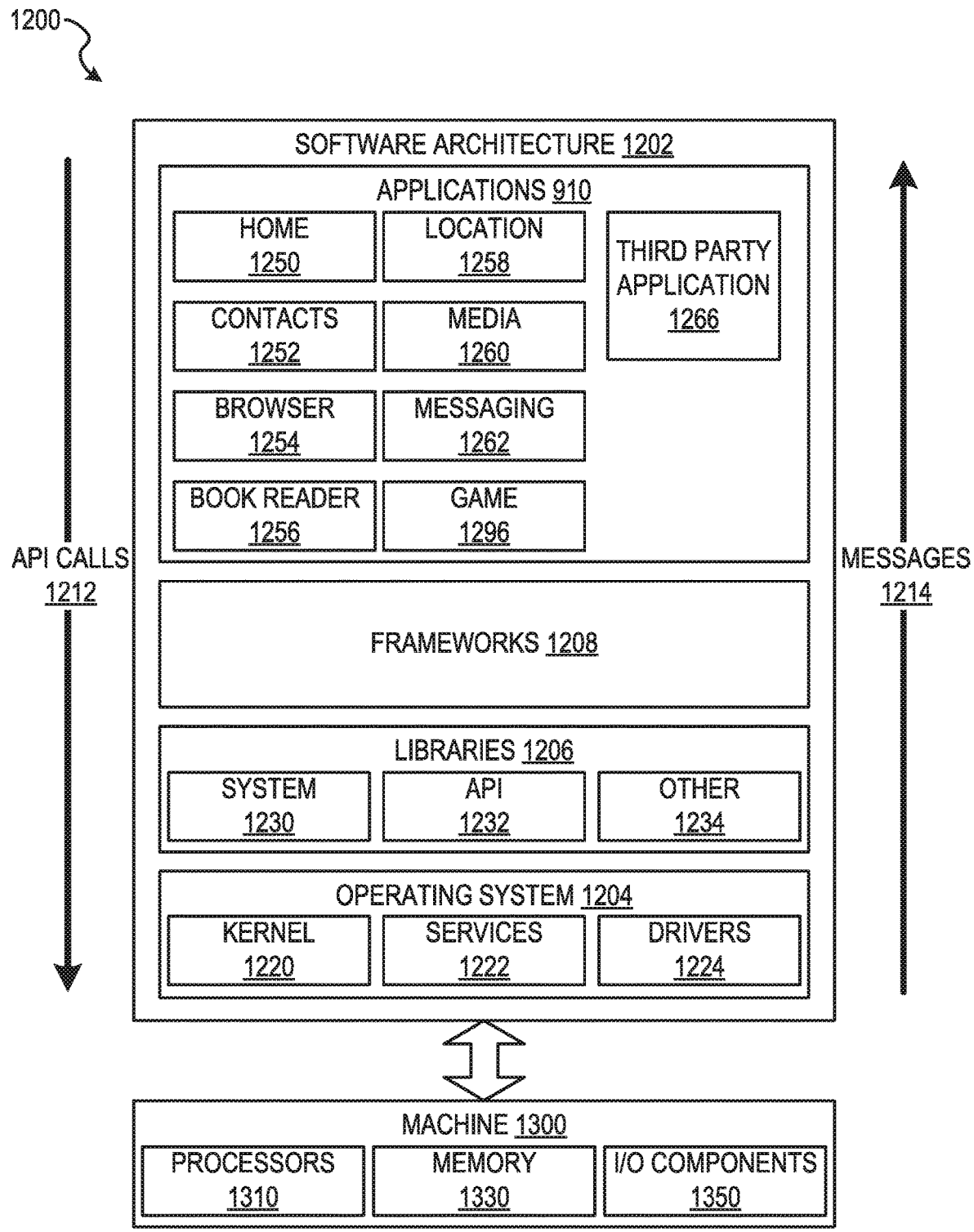
FIG. 12 is a block diagram illustrating an example of a software architecture that may be installed on a machine, according to some exemplary embodiments.

FIG. 12 is a block diagram 1200 illustrating an architecture of software 1202, which can be installed on the devices described above. FIG. 12 is merely a non-limiting example of a software architecture, and it will be appreciated that many other architectures can be implemented to facilitate the functionality described herein. In various embodiments, the software 1202 is implemented by hardware such as machine a 1300 of FIG. 13 that includes processors 1310, memory 1330, and I/O components 1350. In this exemplary architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an exemplary embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266. According to some embodiments, the applications 1210 are programs that execute functions defined in the programs. Various programming languages can be employed to create the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1266 can invoke the API calls 1212 provided by the operating system 1204 to facilitate functionality described herein.

I. Exemplary Machine Architecture and Machine-Readable Medium

Figure 13:
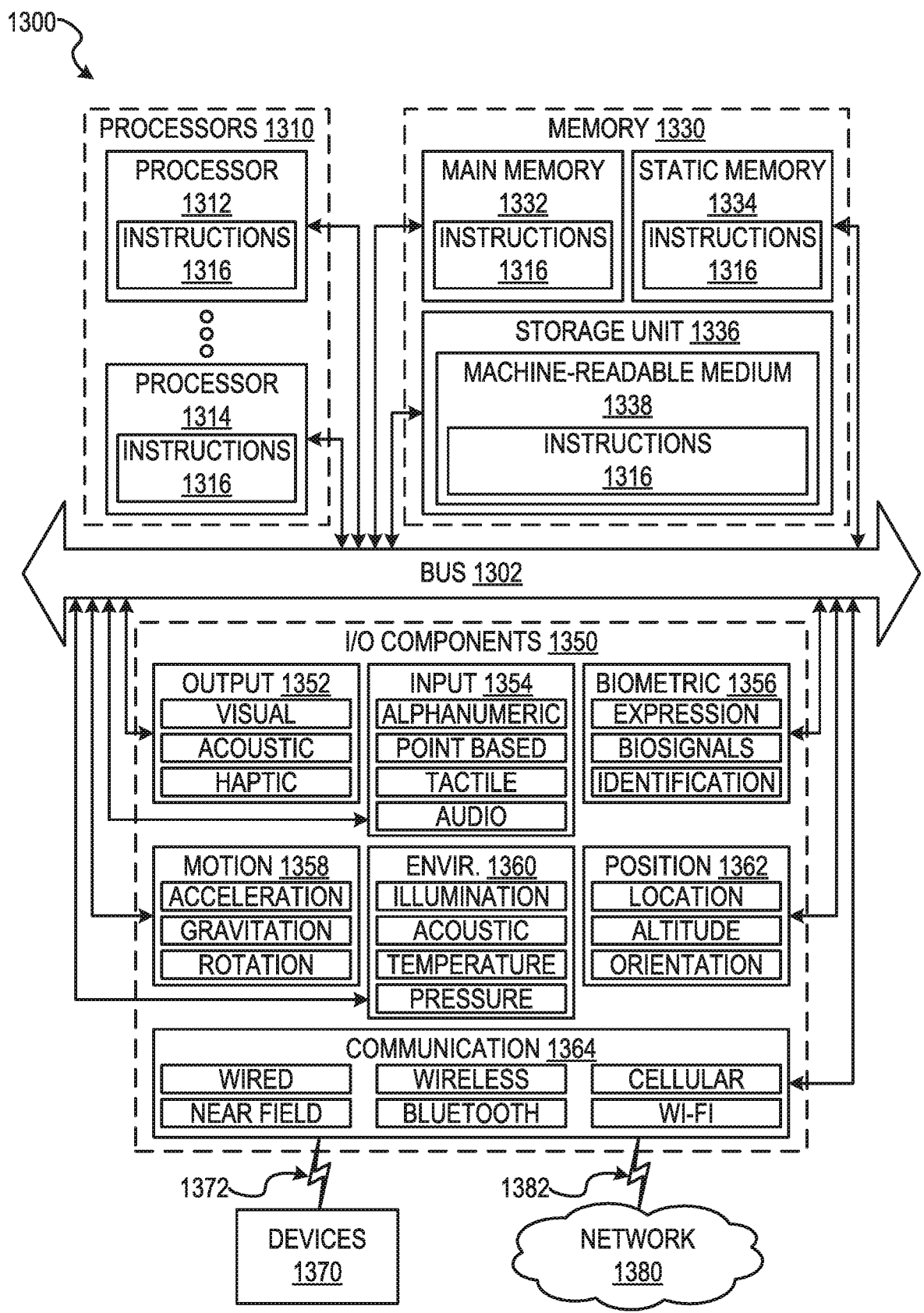
FIG. 13 is a block diagram presenting a diagrammatic representation of a machine in the form of a computer system within which a set of instructions may be executed for causing the machine to perform any of the methodologies discussed herein, according to an exemplary embodiment.

FIG. 13 is a block diagram illustrating components of a machine 1300, according to some embodiments, able to read instructions (e.g., processor executable instructions) from a machine-readable medium (e.g., a non-transitory processor-readable storage medium or processor-readable storage device) and perform any of the methodologies discussed herein. Specifically. FIG. 13 shows a diagrammatic representation of the machine 1300 in the exemplary form of a computer system, within which instructions 1316 (e.g., software, a program, an application, an applet, an app, or other executable code) for causing the machine 1300 to perform any of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any of the methodologies discussed herein.

In various embodiments, the machine 1300 comprises processors 1310, memory 1330, and I/O components 1350, which can be configured to communicate with each other via a bus 1302. In an exemplary embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1312 and a processor 1314 that may execute the instructions 1316. The term "processor" is intended to include multi-core processors that may comprise two or more independent processors (also referred to as "cores") that can execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an exemplary embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by processors of the machine 1300 (e.g., processors 1310), cause the machine 1300 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various exemplary embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further exemplary embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix, Dataglyph, MaxiCode, PDF417. Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geolocation, location via WI-FI® signal triangulation, location via detecting a BLUETOOTH® or NFC beacon signal that may indicate a particular location, and so forth.

J. Transmission Medium

In various exemplary embodiments, portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 4G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In exemplary embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other exemplary embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

K. Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor;
a user interface coupled to the processor, the user interface comprising an input device and a display screen; and
memory coupled to the processor and storing instructions that, when executed by the processor, cause the system to perform operations comprising:
receiving a media content item;
identifying one or more objects depicted in the media content item;
receiving an interaction with the media content item from a user via the input device of the user interface, the interaction selecting an object from among the one or more objects identified in the media content item;
identifying, based on the interaction selecting the object, a set of media overlays, wherein each respective media overlay includes a modifier category identifier and a list of one or more modifier categories compatible with the modifier category identifier for the media content item, and wherein all of the media overlays in the set of media overlays have compatible modifier category identifiers;
presenting, via the display screen of the user interface, a carousel of media overlays based on the set of media overlays, wherein the carousel of media overlays comprises a set of modifier icons, each modifier icon within the set of modifier icons representing a respective media overlay within the set of media overlays, each modifier icon within the set of modifier icons being user selectable to apply the respective media overlay to the media content item;
receiving, via the input device of the user interface, a first user selection of a first modifier icon from among the set of modifier icons, the first modifier icon corresponding to a first media overlay from among the set of media overlays;
applying, in response to receiving the first user selection, the first media overlay to the media content item; and
causing the first modifier icon to move from a first position to a second position and to be displayed in the second position via the display screen of the user interface, the first position being at least a preset distance away from an image capture element and the second position being within the image capture element or closer to the image capture element relative to the first position, the image capture element being user-selectable to capture an image which is based on applying the first media overlay to the media content item.

2. The system of claim 1, wherein identifying the set of media overlays includes determining a modifier context based on the interaction with the media content item, the modifier context associated with a determination of an intent of the user with respect to modifying the media content item.

3. The system of claim 2, wherein determining the modifier context is based on a context indicator that includes one or more of: a geolocation of the system, a time of day, a set of weather data, a face depicted within the media content item, a person of a set of predetermined people depicted within the media content item, a natural feature tracking identification, a representative symbol identifying an entity, a representative symbol identifying an event, a representative symbol identifying a product, a sponsorship, an orientation of the system, a movement of the system, an object type depicted within the media content item, an unlock code applied to a specified modifier, an image capture device position relative to the system, and a modifier popularity score.

4. The system of claim 3, wherein the modifier context includes one or more of: a lens, an image modifier, a filter category, and an activator type.

5. The system of claim 3, wherein media overlays in the set of media overlays having a modifier category identifier that matches the modifier context are ordered ahead of media overlays in the set of media overlays that do not have a modifier category identifier matching the modifier context.

6. The system of claim 3, wherein the media overlays in the set of media overlays are ordered based on a set of rules, the set of rules including one or more of: a priority determination, a sponsorship determination, and an unlock determination.

7. The system of claim 3, wherein identifying the set of media overlays includes excluding, based on the modifier context, a media overlay from the set of media overlays having a plurality of modifier category identifiers.

8. The system of claim 1, wherein the carousel of media overlays are presented in a prioritized list, and wherein each respective media overlay in the carousel of media overlays is ordered based on one or more respective characteristics of the respective media overlay, the respective characteristics including one or more of: availability, relevancy, priority, and performance.

9. The system of claim 6, wherein each respective media overlay in the carousel of media overlays is further ordered based on one or more of: a number of times the respective media overlay is used, a number of times a media overlay is ignored, when an image modifier is used, a time when a media overlay is ignored, a usage context, a location where the media overlay can be used, a location where the media overlay cannot be used, user profile information, and social connection information for the user.

10. The system of claim 1, wherein the system identifies and presents a plurality of carousels of media overlays, wherein each carousel of media overlays is associated with a different category.

11. The system of claim 1, wherein a media overlay in the set of media overlays is associated with a plurality of modifier category identifiers.

12. The system of claim 1, the operations further comprising:
receiving, via the input device of the user interface, a second user selection of a second modifier icon from among the set of modifier icons, the second modifier icon corresponding to a second media overlay from among the set of media overlays;
applying, in response to receiving the second user selection, the second media overlay to the media content item such that both the first media overlay and the second media overlay are applied to the media content item simultaneously; and
causing the second modifier icon to be displayed proximate to or within the image capture element, the image capture element being user-selectable to capture an image which is based on applying the second media overlay to the media content item.

13. The system of claim 1, wherein respective positions of modifier icons within the set of modifier icons in the carousel are modifiable in response to input via the input device of the user interface.

14. The system of claim 1, wherein the system receives a second media content item and displays the second media content item in conjunction with the carousel of media overlays together on the display screen.

15. The system of claim 1, wherein the carousel of media overlays are ranked using one or more of:
a pointwise ranking, a pairwise ranking, and a mean reciprocal ranking.

16. A computer-implemented method comprising:
receiving, by a computer system, a media content item;
identifying one or more objects depicted in the media content item;
receiving, by the computer system, an interaction with the media content item from a user via an input device of a user interface coupled to the computer system, the interaction selecting an object from among the one or more objects identified in the media content item;
identifying, by the computer system and based on the interaction selecting the object, a set of media overlays, wherein each respective media overlay includes a modifier category identifier and a list of one or more modifier categories compatible with the modifier category identifier for the media content item, and wherein all of the media overlays in the set of media overlays have compatible modifier category identifiers;
presenting, by the computer system via a display screen of the user interface, a carousel of media overlays based on the set of media overlays, wherein the carousel of media overlays comprises a set of modifier icons, each modifier icon within the set of modifier icons representing a respective media overlay within the set of media overlays, each modifier icon within the set of modifier icons being user selectable to apply the respective media overlay to the media content item;
receiving, via the input device of the user interface, a first user selection of a first modifier icon from among the set of modifier icons, the first modifier icon corresponding to a first media overlay from among the set of media overlays;
applying, in response to receiving the first user selection, the first media overlay to the media content item; and
causing the first modifier icon to move from a first position to a second position and to be displayed in the second position via the display screen of the user interface, the first position being at least a preset distance away from an image capture element and the second position being within the image capture element or closer to the image capture element relative to the first position, the image capture element being user-selectable to capture an image which is based on applying the first media overlay to the media content item.

17. A non-transitory computer-readable medium storing instructions that, when executed by a computer system, cause the computer system to perform operations comprising:
receiving a media content item;
identifying one or more objects depicted in the media content item;
receiving an interaction with the media content item from a user via an input device of a user interface coupled to the computer system, the interaction selecting an object from among the one or more objects identified in the media content item;
identifying, based on the interaction selecting the object, a set of media overlays, wherein each respective media overlay includes a modifier category identifier and a list of one or more modifier categories compatible with the modifier category identifier for the media content item, and wherein all of the media overlays in the set of media overlays have compatible modifier category identifiers;
presenting, via a display screen of the user interface, a carousel of media overlays based on the set of media overlays, wherein the carousel of media overlays comprises a set of modifier icons, each modifier icon within the set of modifier icons representing a respective media overlay within the set of media overlays, each modifier icon within the set of modifier icons being user selectable to apply the respective media overlay to the media content item;
receiving, via the input device of the user interface, a first user selection of a first modifier icon from among the set of modifier icons, the first modifier icon corresponding to a first media overlay from among the set of media overlays;
applying, in response to receiving the first user selection, the first media overlay to the media content item; and
causing the first modifier icon to move from a first position to a second position and to be displayed in the second position via the display screen of the user interface, the first position being at least a preset distance away from an image capture element and the second position being within the image capture element or closer to the image capture element relative to the first position, the image capture element being user-selectable to capture an image which is based on applying the first media overlay to the media content item.

18. The system of claim 1, wherein the modifier category identifiers include one or more of: a face modifier, an atmospheric modifier, a ground modifier, a face swapping modifier, an emotion modifier, and a costume modifier.

19. The system of claim 1, wherein the media content item corresponds to a real-time image captured by an image capture device of the system.

20. The system of claim 1, further comprising:
presenting, via the display screen of the user interface, a search icon outside of the carousel of media overlays, the search icon being user selectable to search for a specific modifier icon within the set of modifier icons.

* * * * *